United States Patent
Shimizu

(10) Patent No.: US 10,855,884 B2
(45) Date of Patent: Dec. 1, 2020

(54) DISPLAY DEVICE, SIGNAL PROCESSING DEVICE, AND METHOD FOR CONTROLLING DISPLAY DEVICE

(71) Applicant: SEIKO EPSON CORPORATION, Tokyo (JP)

(72) Inventor: Nobuyuki Shimizu, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 35 days.

(21) Appl. No.: 16/263,432

(22) Filed: Jan. 31, 2019

(65) Prior Publication Data

US 2019/0238721 A1    Aug. 1, 2019

(30) Foreign Application Priority Data

Feb. 1, 2018   (JP) .................................. 2018-016688

(51) Int. Cl.

| H04N 1/40 | (2006.01) |
|---|---|
| H04N 1/60 | (2006.01) |
| G09G 5/02 | (2006.01) |
| G03B 21/20 | (2006.01) |
| G06F 3/14 | (2006.01) |
| H04N 9/12 | (2006.01) |

(52) U.S. Cl.
CPC ............. H04N 1/60 (2013.01); G03B 21/206 (2013.01); G06F 3/14 (2013.01); G09G 5/02 (2013.01); H04N 1/40006 (2013.01); H04N 9/12 (2013.01)

(58) Field of Classification Search
CPC ......... G09G 2340/0435; H04N 7/0127; H04N 19/136; H04N 19/147; H04N 19/156; H04N 19/157
See application file for complete search history.

(56) References Cited

U.S. PATENT DOCUMENTS

| 6,738,922 B1 | 5/2004 | Warwar et al. |
| 9,215,466 B2* | 12/2015 | Zhai ...................... H04N 19/61 |
| 2001/0033188 A1 | 10/2001 | Aung et al. |
| 2003/0212930 A1 | 11/2003 | Aung et al. |
| 2008/0031385 A1 | 2/2008 | Aung et al. |

(Continued)

FOREIGN PATENT DOCUMENTS

| JP | H05-315945 A | 11/1993 |
| JP | 2002-164782 A | 6/2002 |
| JP | 2002-305431 A | 10/2002 |

(Continued)

*Primary Examiner* — Antonio A Caschera
(74) *Attorney, Agent, or Firm* — Oliff PLC

(57) ABSTRACT

A display device which displays an image based on an input image signal includes: a first IC which performs first processing on the input image signal; a second IC which performs second processing on the signal processed by the first IC; and a setting unit which measures a frequency of the input image signal and sets a reference frequency inputted to the first IC, based on the measured frequency. The first IC is configured to be able to receive the input image signal within a frequency range decided by the reference frequency. The setting unit sets the reference frequency such that the frequency range decided by the reference frequency includes the frequency of the input image signal, if the frequency of the input image signal is out of the frequency range decided by the reference frequency.

18 Claims, 5 Drawing Sheets

(56) References Cited

U.S. PATENT DOCUMENTS

2015/0281574 A1  10/2015  Nishida
2017/0155529 A1   6/2017  Aung et al.

FOREIGN PATENT DOCUMENTS

JP   2015-73313 A    4/2015
JP   2015-198265 A  11/2015
WO   01/69837 A2    9/2001

* cited by examiner

DISPLAY DEVICE, SIGNAL PROCESSING DEVICE, AND METHOD FOR CONTROLLING DISPLAY DEVICE

The entire disclosure of Japanese Patent Application No. 2018-016688, filed Feb. 1, 2018 is expressly incorporated by reference herein.

BACKGROUND

1. Technical Field

The present invention relates to a display device, a signal processing device, and a method for controlling a display device.

2. Related Art

According to the related art, a device which processes image data via a plurality of integrated circuits, with the integrated circuits transmitting data between them by high-speed serial communication such as SDI (Serial Digital Interface), is known (see, for example, JP-A-2015-198265).

To process image data using an integrated circuit, electrical specifications or the like of data inputted to and outputted from the integrated circuit need to be adapted. For example, the image processing IC (integrated circuit) described in JP-A-2015-198265 is equipped with a circuit which multiplies and/or divides the frequency of a reference clock received from outside and thus generates a clock for internal processing. In this configuration, the frequency of data inputted to the image processing IC needs to fall within a range with which the clock for internal processing can synchronize. That is, an IC of this type synchronizes the clock frequency for internal processing with input data within a predetermined frequency range, for example, using a PLL (phase-locked loop). In other words, a signal that the IC can receive is limited to data within the predetermined frequency range.

Many standards for image data prescribe an allowable range of frequency change. The image processing IC needs to receive image data within the prescribed range of change and thus have image data that the image processing IC can process. Therefore, the IC that can be used for image processing is limited.

JP-A-2002-305431 discloses a method of counting the carrier frequency of an input signal by a frequency counter and detecting an amount of shift of the frequency of the carrier wave. In the method of JP-A-2002-305431, amounts of shift of the frequency of the input signal that do not exceed a set range are averaged, and if the average amount of shift exceeds a target range, a set value corresponding to the average amount of shift is inputted to a synthesizer. The synthesizer generates a frequency signal including the amount of shift of the frequency of the carrier wave, thus coping with the variation of the frequency of the input signal. The technique of JP-A-2002-305431, which averages amounts of shift of frequency to cope with the average variation of frequency, is limited to the case where the range of variation of frequency is narrow. Therefore, JP-A-2002-305431 employs a technique of averaging amounts of shift of the frequency of an input signal that do not exceed a set range.

Thus, it is desired that an IC can process, for example, even an input signal whose range of frequency change exceeds an allowable frequency range prescribed by the specifications of the IC.

SUMMARY

An advantage of some aspects of the invention is that an IC can process even an input signal whose frequency departs from an allowable frequency range of the IC.

An aspect of the invention is directed to a display device which displays an image based on an input image signal and includes: a first IC which performs first processing on the input image signal; a second IC which performs second processing on the signal processed by the first IC; and a setting unit which measures a frequency of the input image signal and sets a reference frequency inputted to the first IC, based on the measured frequency. The first IC is configured to be able to receive the input image signal within a frequency range decided by the reference frequency. The setting unit sets the reference frequency such that the frequency range decided by the reference frequency includes the frequency of the input image signal, if the frequency of the input image signal is out of the frequency range decided by the reference frequency.

This configuration enables the first IC to process even an input image signal whose frequency is out of the frequency range that the first IC can receive.

In the aspect of the invention, the setting unit may measure the frequency of the input image signal if an accuracy of the frequency of the input image signal includes a change over a broader range than the frequency range that the first IC can receive.

This configuration can measure the frequency of an input image signal and cope with the frequency of the input image signal, if the first IC may not be able to receive the input image signal.

In the aspect of the invention, the setting unit may measure the frequency of the input image signal when inputting of the input image signal is started.

This configuration can restrain the frequency of measuring the frequency of an input image signal and thus can reduce the processing load.

In the aspect of the invention, the first IC may output a signal having a higher transmission speed than the input image signal, to the second IC.

This configuration enables the first IC capable of handling an output of a high-speed signal to receive and process an input image signal over a broad frequency range, even if the first IC has specifications prescribing a narrow allowable frequency range for input image signal.

In the aspect of the invention, the first IC may have a PLL circuit which is locked to the frequency of the input image signal, based on the reference frequency. The setting unit may set the reference frequency in such a way as to include the frequency of the input image signal into a frequency range to which the PLL circuit is locked.

This configuration can set a reference frequency of the PLL circuit, corresponding to the input image signal, and can set a frequency range to which the PLL circuit is locked, according to the input image signal. Thus, the first IC can securely process the input image signal.

In the aspect of the invention, the first IC may perform at least one of resolution conversion processing, color correction processing, and image blending processing, on the input image signal.

This configuration enables the IC performing resolution conversion processing, color correction processing or image blending processing on an input image signal, to receive and process an input image signal over a broad frequency range.

A signal processing device according to another aspect of the invention includes: a first IC which performs first processing on an input signal; a second IC which performs second processing on the signal processed by the first IC; and a setting unit which measures a frequency of the input signal and sets a reference frequency inputted to the first IC, based on the measured frequency. The first IC is configured to be able to receive the input signal within a frequency range decided by the reference frequency. The setting unit sets the reference frequency such that the frequency range decided by the reference frequency includes the frequency of the input signal, if the frequency of the input signal is out of the frequency range decided by the reference frequency.

This configuration enables the first IC to process even an input signal whose frequency is out of the frequency range that the first IC can receive.

Still another aspect of the invention is directed to a method for controlling a display device is for a display device having a first IC which performs first processing on an input image signal and a second IC which performs second processing on the signal processed by the first IC and displaying an image based on the input image signal. The method includes: causing the first IC to receive the input image signal within a frequency range decided by a reference frequency and perform the first processing; measuring a frequency of the input image signal; and setting the reference frequency inputted to the first IC such that the frequency range decided by the reference frequency includes the frequency of the input image signal, if the frequency of the input image signal is out of the frequency range decided by the reference frequency.

This configuration enables the first IC to process even an input image signal whose frequency is out of the frequency range that the first IC can receive.

BRIEF DESCRIPTION OF THE DRAWINGS

The invention will be described with reference to the accompanying drawings, wherein like numbers reference like elements.

DESCRIPTION OF EXEMPLARY EMBODIMENTS

Configuration of Display Device

Figure 1:
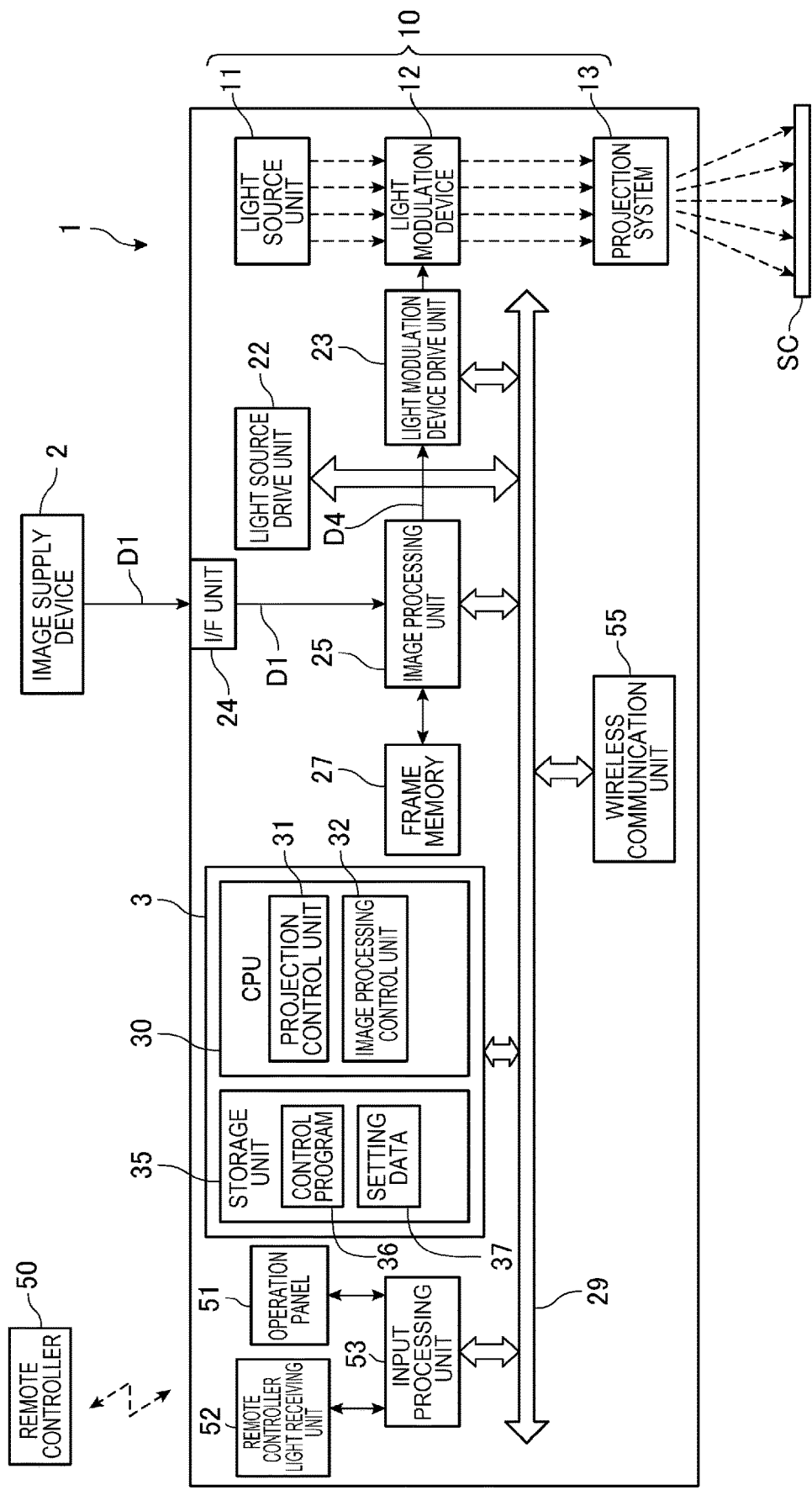
FIG. 1 is a block diagram showing the configuration of a projector.

FIG. 1 is a block diagram showing the configuration of a projector 1 according to an embodiment to which the invention is applied.

To the projector 1 as a display device, an image supply device 2 is connected as an external device. The image supply device 2 outputs an input image signal D1 to the projector 1. The projector 1 projects a projection image onto a screen SC, based on the input image signal D1 inputted from the image supply device 2. The projection of the projection image by the projector 1 is an example of the display of an image by the display device.

The input image signal D1 outputted by the image supply device 2 is digital image data. In this embodiment, the input image signal D1 is data conforming to the HDMI (trademark registered) standard. HDMI is the acronym of High-Definition Multimedia Interface. The content of the input image signal D1 may be a still image or dynamic image and may accompany an audio signal or audio data.

The image supply device 2 is a so-called image source which outputs the input image signal D1 to the projector 1. The image supply device 2 may be any device that can be connected to the projector 1 and can output the input image signal D1 to the projector 1. For example, a disk-type recording medium playback device, television tuner device, or personal computer may be used.

The screen SC (projection surface) may be a curtain-like screen. A wall surface of a building or a flat surface of an installed object may be used as the screen SC. The screen SC is not limited to a flat surface and may be a curved surface or rugged surface.

The projector 1 has a control unit 3 which controls each part of the projector 1, and a projection unit 10 which projects a projection image. The control unit 3 is made up of a CPU 30 and a storage unit 35 or the like. The storage unit 35 is a storage device which stores, in a non-volatile manner, a control program 36 executed by the CPU 30 and data. The storage unit 35 is made up of a semiconductor storage element such as a flash ROM. The storage unit 35 may include a RAM which forms a work area for the CPU 30.

The CPU 30 executes the control program 36 of the projector 1 saved in the storage unit 35 and thus functions as a projection control unit 31 and an image processing control unit 32. That is, these functional blocks are implemented by a collaboration of software and hardware as the CPU 30 executes the control program 36.

The storage unit 35 also stores setting data 37 in addition to the control program 36. The storage unit 35 may also store other programs and data.

The projection unit 10 has a light source unit 11, a light modulation device 12, and a projection system 13. The light source unit 11 is made up of a lamp such as a halogen lamp, xenon lamp or ultra-high-pressure mercury lamp, or a solid-state light source such as an LED or laser light source. When supplied with electric power from a light source drive unit 22, the light source unit 11 turns on and emits light toward the light modulation device 12.

The light source drive unit 22 supplies a drive current or pulse to the light source unit 11 under the control of the control unit 3 and causes the light source unit 11 to emit light.

The light modulation device 12 has an image forming unit such as a liquid crystal panel which is driven by a light modulation device drive unit 23 and thus forms an image. The light modulation device 12 modulates the light emitted from the light source unit 11 by the image formed on the image forming unit, generates image light, and projects the image light toward the projection system 13. The image forming unit is made up of a transmission-type liquid crystal panel, reflection-type liquid crystal panel, digital mirror device (DMD) or the like.

The light modulation device drive unit 23 drives the light modulation device 12 according to an image signal inputted from an image processing unit 25, sets the gradation level of each pixel in the image forming unit, and draws an image on a frame basis.

The projection system 13 has an optical element such as a lens, mirror or the like. The projection system 13 causes the light modulated by the light modulation device 12 to form an image on the screen SC and thus projects a projection image.

The projector 1 has an interface unit 24, the image processing unit 25, a frame memory 27, an input processing unit 53, an operation panel 51, a remote controller light receiving unit 52, and a wireless communication unit 55. These units are connected to the control unit 3 via a bus 29 in such a way as to be able to communicate data.

The interface (I/F) unit 24 is a wired interface for data communication and has a connector (not illustrated) and an interface circuit (not illustrated) or the like. The interface unit 24 is connected to the image supply device 2 via a cable and transmits and receives digital image data and control data or the like to and from an external device, under the control of the control unit 3. As the interface unit 24, various communication interfaces and an interface for image input can be employed. In this embodiment, an HDMI interface is provided.

The wireless communication unit 55 has an antenna and a RF circuit (not illustrated) or the like and executes wireless data communication with an external device, under the control of the control unit 3. The wireless communication unit executes wireless communication such as wireless LAN (including Wi-Fi (trademark registered)) or Bluetooth (trademark registered).

To the light modulation device drive unit 23, an image signal of an image to be drawn on the light modulation device 12 is inputted from the image processing unit 25.

The image processing unit 25 loads an image based on the input image signal D1 received via the interface unit 24, onto the frame memory 27. The image processing unit 25 executes various kinds of image processing on the image loaded on the frame memory 27. The image processing unit 25 generates an output image signal D4 for displaying the image loaded on the frame memory 27 and outputs the output image signal D4 to the light modulation device drive unit 23. Details of the image processing unit 25 will be described later.

The input processing unit 53 is connected to the operation panel 51 and the remote controller light receiving unit 52. When the operation panel 51 or the remote controller light receiving unit 52 accepts an operation, the input processing unit 53 generates operation data corresponding to the accepted operation and outputs the operation data to the control unit 3.

The operation panel 51 is provided on the casing of the projector 1 and has various switched which a user can operate. The input processing unit 53 detects an operation of each switch on the operation panel 51.

The remote controller light receiving unit 52 receives an infrared signal transmitted from a remote controller 50. The input processing unit 53 decodes the signal received by the remote controller light receiving unit 52, generates operation data, and outputs the operation data to the control unit 3.

The setting data 37 stored in the storage unit 35 includes a set value about an operation of the projector 1. The set value included in the setting data 37 is, for example, the content of processing executed by the image processing unit 25, or a parameter used for the processing by the image processing unit 25, or the like.

The projection control unit 31 controls each part of the projector 1 and thus causes the projection unit 10 to project a projection image. The projection control unit 31 controls the image processing unit 25 to execute image processing on the input image signal D1 inputted to the interface unit 24 and output the output image signal D4 to the light modulation device drive unit 23. The projection control unit 31 controls the light source drive unit 22 and the light modulation device drive unit 23 and thus turns on the light source unit 11 and causes the light modulation device drive unit 23 to drive the light modulation device 12.

The image processing control unit 32 (setting unit) controls the processing on the input image signal D1 by the image processing unit 25.

Configuration of Signal Processing Device

Figure 2:
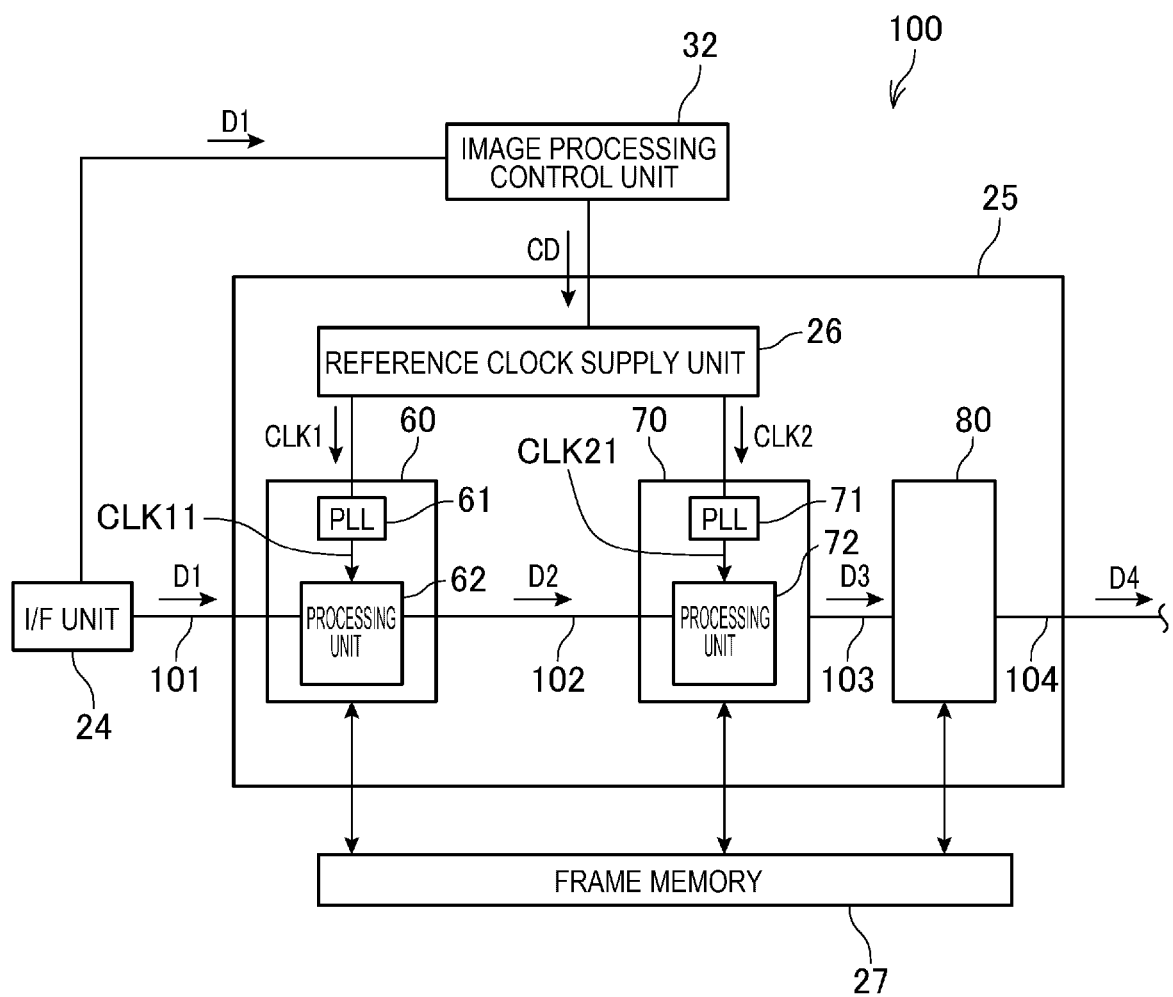
FIG. 2 is a block diagram of an image processing unit.

FIG. 2 is a block diagram of the image processing unit 25. To facilitate understanding, FIG. 2 shows the interface unit 24, the frame memory 27, and the image processing control unit 32.

The image processing unit 25 takes in an input image signal D1 inputted from the interface unit 24. The image processing unit 25 is also connected to the image processing control unit 32. Control data CD is inputted to the image processing unit 25 from the image processing control unit 32.

The image processing unit 25 has a first image processing IC 60 (first IC) and a second image processing IC (second IC) which process image data. The first image processing IC 60 and the second image processing IC 70 are semiconductor devices equipped with a processor carrying out arithmetic processing and are made up of an ASIC or PLD (programmable logic device). The first image processing IC 60 and the second image processing IC 70 in this embodiment are FPGAs (field-programmable gate arrays).

The image processing unit 25 also has a third image processing IC 80. The third image processing IC 80 is installed, for example, on a different substrate from the first image processing IC 60 and the second image processing IC 70. The third image processing IC 80 is an IC which processes image data, and is not limited to any specific form.

The first image processing IC 60 is connected to the interface unit 24 via a bus 101. The input image signal D1 (input signal) is inputted to the first image processing IC 60 via the bus 101. The bus 101 is a transmission path to transmit the input image signal D1 in the HDMI 2.0 format. More specifically, the bus 101 executes the TMDS (trademark registered) protocol and thus transmits the input image signal D1. TMDS is the acronym of transition minimized differential signaling.

The input image signal D1 is, for example, data with a resolution of 4k (2160p (3840×2160)) and a frame rate of 60 Hz. In the description below, the resolution and frame rate of the image signal are expressed with the sign "@", such as 4k@60 Hz. The bus 101 is a transmission path corresponding to HDMI 2.0 data transmission at 6 Gbits/second. The interface unit 24 and the second image processing IC 70 have a transceiver/receiver (not illustrated) conforming to the transmission specifications of the bus 101. In this case, the clock frequency of the input image signal D1 is 148.5 MHz. The accuracy of the frequency is ±5000 ppm according to the HDMI standard.

The first image processing IC 60 is connected to the second image processing IC 70 via a bus 102. The first image processing IC 60 executes image processing on the input image signal D1 and outputs an image signal D2 resulting from the processing, to the second image processing IC 70 via the bus 102.

The image signal D2 is, for example, image data of 4k@120 Hz. The bus 102 is a transmission path corresponding to 12G-SDI (serial digital interface) data transmission at 12 Gbits/second. The first image processing IC 60 and the second image processing IC 70 have a transceiver/receiver (not illustrated) conforming to the transmission specifications of the bus 102. In this case, the clock frequency of the image signal D2 is 297 MHz.

The accuracy of the clock frequency of the image signal D2 is prescribed as ±10 ppm by the SMPTE ST-2082 standard. However, there is no reason to limit the accuracy to ±10 ppm if both of the first image processing IC 60 and the second image processing IC 70 can cope with a frequency change over a range beyond ±10 ppm. For example, in this embodiment, each of the first image processing IC 60 and the second image processing IC 70 can tolerate ±1000 ppm as the accuracy of the frequency of the image signal D2.

The second image processing IC 70 is connected to the third image processing IC 80 via a bus 103. The third image processing IC 80 may be made up of one IC or a plurality of ICs. In the latter case, the second image processing IC 70 is connected to the individual ICs of the plurality of ICs forming the third image processing IC 80, via corresponding buses, and these buses are collectively referred to as the bus 103.

The second image processing IC 70 executes image processing on the image signal D2 and outputs an image signal D3 resulting from the processing, to the third image processing IC 80 via the bus 103.

The bus 103 is made up of a transmission path, for example, conforming to the LVDS (trademark registered) standard. LVDS is the acronym of low-voltage differential signaling. The bus 103 is, for example, a transmission path of LVDS four phases by three channels and transmits the image signal D3 to the third image processing IC 80. For example, if the third image processing IC 80 is made up of three ICs, the bus 103 transmits the image signal D3 to each of the three ICs via LVDS four-phase channels. The third image processing IC 80 processes the image signal D3 and outputs an output image signal D4 to outside IC. In this embodiment, the third image processing IC 80 is connected to the light modulation device drive unit 23 via a bus 104. The bus 104 is, for example, a transmission path conforming to the V-By-One (trademark registered), LVDS, FPD-Link (trademark registered) or similar transmission standard. In the description below, V-By-One is abbreviated as VBO. The bus 104 transmits the output image signal D4 of, for example, 4k@120 Hz, to the light modulation device drive unit 23 by a transmission method such as VBO×16 channels, LVDS, or FPD-Link. The light modulation device drive unit 23 draws an image on the image forming unit of the light modulation device 12 according to the output image signal D4.

The third image processing IC 80 executes, for example, image processing including color correction processing or the like for each color of R (red), G (green), and B (blue), onto the image signal D3. In the course of processing the image signal D3, the third image processing IC 80 can access the frame memory 27.

The image processing unit 25 has a reference clock supply unit 26 which generates a reference clock according to control data CD inputted from the image processing control unit 32. The reference clock supply unit 26 generates a reference clock with a frequency designated by the control data CD and outputs reference clock signals CLK1, CLK2 to the first image processing IC 60 and the second image processing IC 70. The reference clock signal CLK1 and the reference clock signal CLK2 may be signals with the same frequency or signals with different frequencies.

The first image processing IC 60 has a PLL circuit 61 and a processing unit 62 which processes the input image signal D1 and outputs the image signal D2. The processing unit 62 has an IP core or the like which executes image processing. The PLL circuit 61 is supplied with the reference clock signal CLK1 as a reference frequency from the reference clock supply unit 26. The PLL circuit 61 divides or multiplies the frequency of the reference clock signal CLK1, thus generates an internal clock signal CLK11, and supplies the internal clock signal CLK11 to the processing unit 62. The processing unit 62 receives the input image signal D1 inputted via the bus 101, based on the internal clock signal CLK11, and executes image processing.

The second image processing IC 70 has a PLL circuit 71 and a processing unit 72 which processes the image signal D2 and outputs the image signal D3. The processing unit 72 has an IP core or the like which executes image processing. The PLL circuit 71 is supplied with the reference clock signal CLK2 from the reference clock supply unit 26. The PLL circuit 71 divides or multiplies the frequency of the reference clock signal CLK2 to a reference frequency, then generates an internal clock signal CLK21 based on the reference frequency, and supplies the internal clock signal CLK21 to the processing unit 72. The processing unit 72 receives the image signal D2 inputted via the bus 102, based on the internal clock signal CLK21, and executes image processing.

The image processing executed by the processing unit 62 and the processing unit 72 is processing such as scaling, color correction, or blending of a plurality of images. In this embodiment, the processing unit 62 scales the input image signal D1 and outputs the image signal D2 of 4k@120 Hz based on the input image signal D1 of 4k@60 Hz. The processing unit 72 performs color correction processing on the image signal D2 and corrects the gradation level of each pixel included in the frame of the image signal D2. The processing unit 62 and the processing unit 72 can access the frame memory 27 when executing the image processing.

As described above, the bus 102 connecting the first image processing IC 60 and the second image processing IC 70 is a transmission path conforming to 12G-SDI and can transmit the image signal D2 of 4k@120 Hz by a simple wiring configuration.

The PLL circuit 61 has the function of locking the internal clock signal CLK11 in tune with the frequency of the input image signal D1. The range to which the PLL circuit 61 can lock the internal clock signal CLK11 includes the reference frequency of the PLL circuit 61, for example, a range of ±1000 ppm from the reference frequency. The processing unit 62 can receive and process the input image signal D1 if the internal clock signal CLK11 can be locked to the input image signal D1. The range to which the PLL circuit 61 can lock the internal clock signal CLK11 is now defined as a receivable range R2. The first image processing IC 60 can receive the input image signal D1 if the frequency of the input image signal D1 is within the receivable range R2. The first image processing IC 60 cannot receive the input image signal D1 if the frequency of the input image signal D1 is out of the receivable range R2.

The range to which the PLL circuit 61 can lock the internal clock signal CLK11 also influences the processing of the image signal D2 outputted from the processing unit 62. The first image processing IC 60 and the second image processing IC 70 perform high-speed 12G-SDI data transmission via the bus 102. To perform high-speed serial data transmission such as 12G-SDI the internal clock signals CLK11, CLK21 need to be very accurate. Therefore, the PLL circuit 61 needs to be of high enough quality to stably generate the internal clock signal CLK11 with high accuracy. The accuracy and the breadth of the receivable range R2 of the PLL circuit 61 are in a kind of trade-off relation. The same applies to the PLL circuit 71. Therefore, the breadth of the receivable range R2 is decided by the accuracy and specifications of the PLL circuit 61 that enable execution of 12G-SDI transmission.

Similarly, the PLL circuit 71 has the function of locking the internal clock signal CLK21 in tune with the frequency of the image signal D2. The range to which the PLL circuit 71 can lock the internal clock signal CLK21 includes the reference frequency of the PLL circuit 71, for example, a range of ±1000 ppm from the reference frequency. The processing unit 72 can receive and process the image signal D2 if the internal clock signal CLK21 can be locked to the image signal D2. The range to which the PLL circuit 71 can lock the internal clock signal CLK21 is defined as a receivable range R3. The second image processing IC 70 can receive the image signal D2 if the frequency of the image signal D2 is within the receivable range R3.

To the image processing control unit 32, the input image signal D1 is inputted from the interface unit 24. The image processing control unit 32 measures the frequency of the input image signal D1 inputted to the interface unit 24 and generates the control data CD based on the measured frequency. The control data CD is data designating a setting of the frequencies of the reference clock signals CLK1, CLK2 generated by the reference clock supply unit 26. The reference clock supply unit 26 generates and outputs the reference clock signals CLK1, CLK2 according to the frequency set by the control data CD. The PLL circuits 61, 71 operate, based on the reference clock signals CLK1, CLK2 as reference frequencies. Thus, the image processing control unit 32 can change the reference frequencies of the PLL circuits 61, 71.

The image processing control unit 32 and the image processing unit 25 together form a signal processing device 100. The signal processing device 100 may include the frame memory 27.

Change in Frequency of Input Image Signal

Figure 3A:
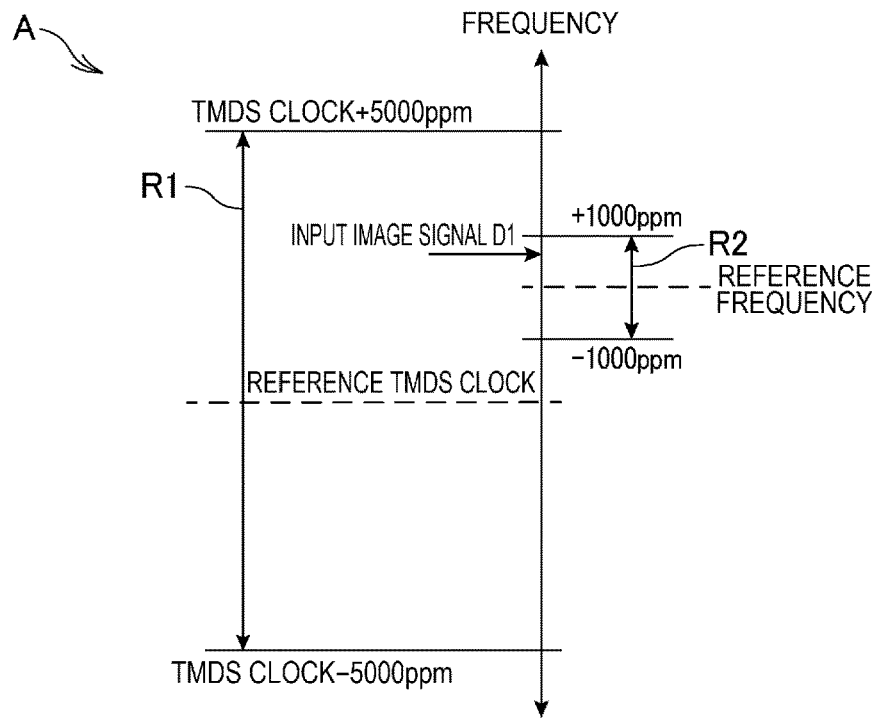
FIGS. 3A and 3B are schematic views showing the correspondence between an input image signal and a receivable range of a first image processing IC.
Figure 3B:
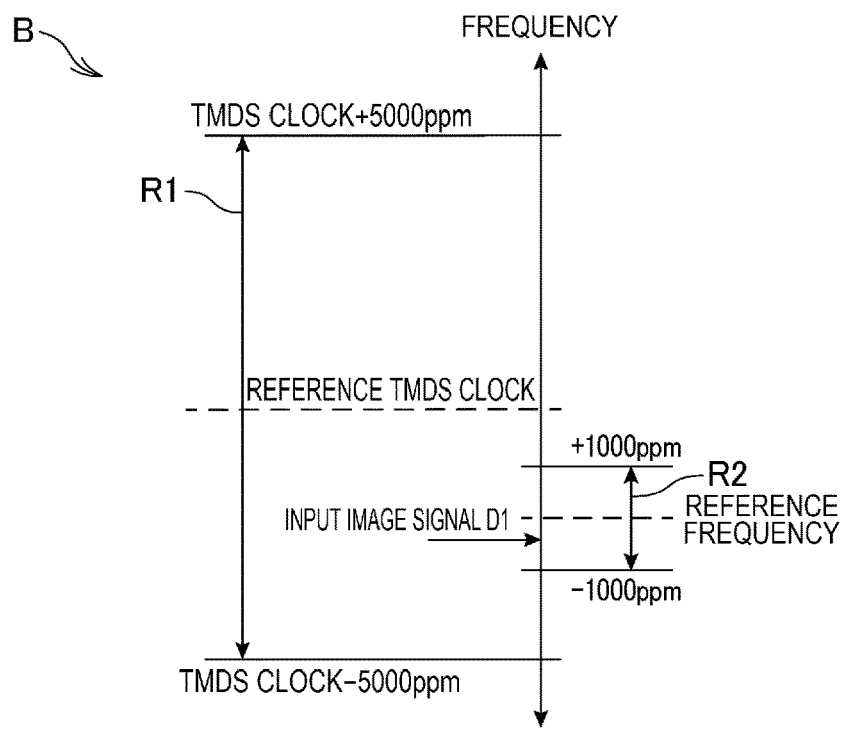

FIGS. 3A and 3B are schematic views showing the correspondence between the input image signal D1 and the receivable range R2 of the first image processing IC 60. FIGS. 3A and 3B showcases of different frequencies of the input image signal D1.

The correspondence shown in FIG. 3A is the correspondence between the clock frequency of the input image signal D1 and the receivable range R2. Since the input image signal D1 is transmitted according to the TMDS protocol via the bus 101, FIGS. 3A and 3B show the clock frequency of the input image signal D1 as TMDS clock. In the case of HDMI 2.0 data transmission at 6 Gbits/second, the prescribed TMDS clock frequency ("reference TMDS clock" shown in FIGS. 3A and 3B) is 148.5 MHz.

As described above, the accuracy of the clock frequency of the input image signal D1 is ±5000 ppm according to the HDMI standard. Therefore, the frequency of the input image signal D1 may change within a range of ±5000 ppm from the prescribed TMDS clock frequency, as shown in FIGS. 3A and 3B. This range of change is defined as an allowable range R1. Since the allowable range R1 is in conformity with the accuracy prescribed by the HDMI standard, the input image signal D1 inputted from the image supply device 2 (FIG. 1) may change within the allowable range R1.

Meanwhile, the receivable range R2, which is the frequency range over which the first image processing IC 60 can receive the input image signal D1, is ±1000 ppm, as described above. Therefore, the frequency of the input image signal D1 may depart from the receivable range R2 even if the input image signal D1 meets the HDMI standard.

For example, in the state shown in FIG. 3A, the frequency of the TMDS clock of the input image signal D1 is higher than the prescribed TMDS clock frequency. In the example of FIG. 3A, the frequency of the input image signal D1 is included in the receivable range R2 corresponding to the preset reference frequency. However, for example, if the frequency of the input image signal D1 changes to a lower frequency than the prescribed TMDS clock frequency, as shown in FIG. 3B, the frequency of the input image signal D1 departs from the receivable range R2 shown in FIG. 3A.

The signal processing device 100 in this embodiment changes the frequency of the reference clock signal CLK1 supplied from the reference clock supply unit 26, according to the change in the frequency of the input image signal D1. Thus, the reference frequency of the PLL circuit 61 changes and the receivable range R2 shifts. In the example of FIG. 3B, the reference frequency is changed according to the frequency of the input image signal D1 becoming lower, and this shifts the receivable range R2 to the low-frequency side. Therefore, the input image signal D1 after the change is included in the receivable range R2. Thus, the first image processing IC 60 can receive the input image signal D1.

Operations of Signal Processing Device

Figure 4:
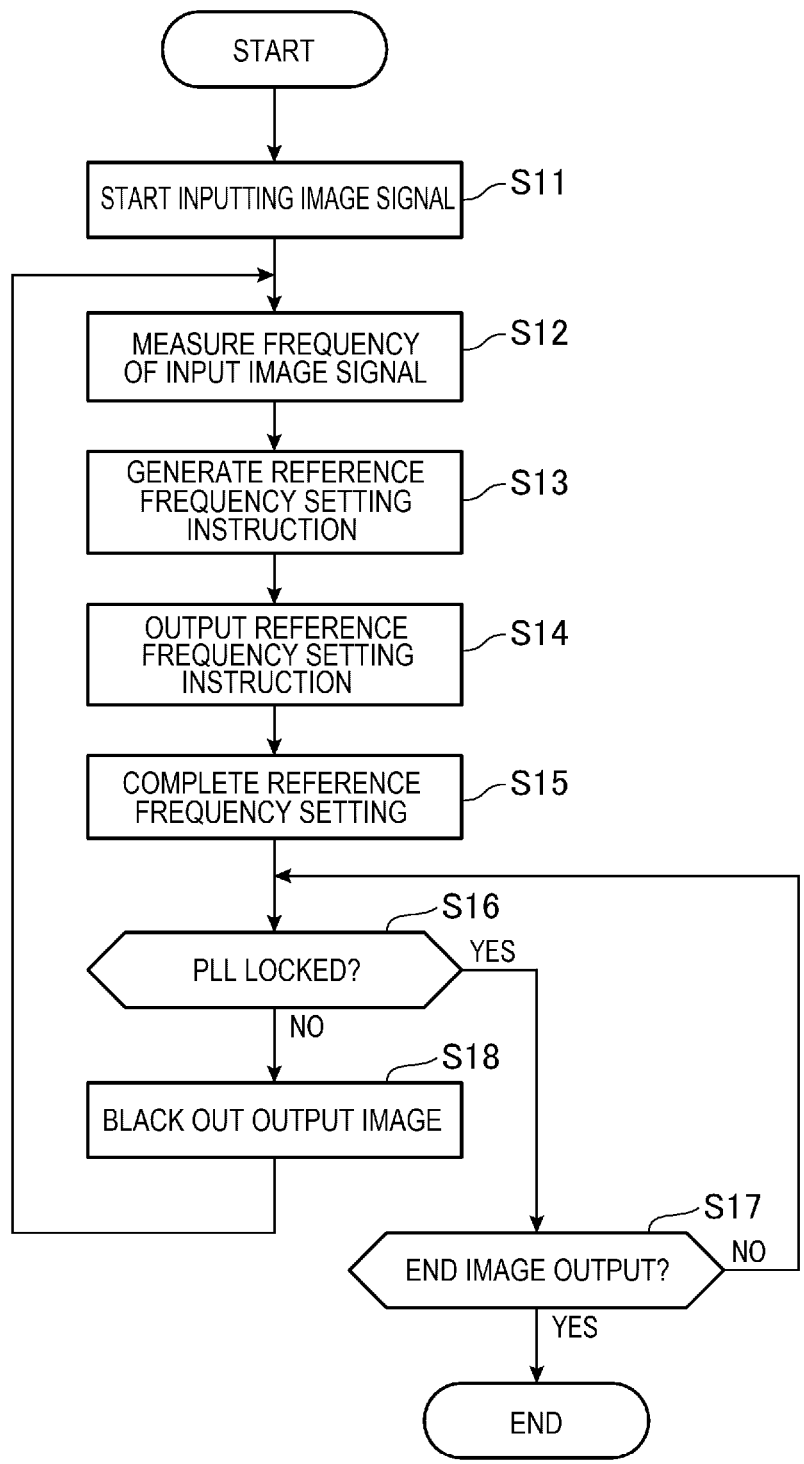
FIG. 4 is a flowchart showing operations of the projector.
Figure 5:
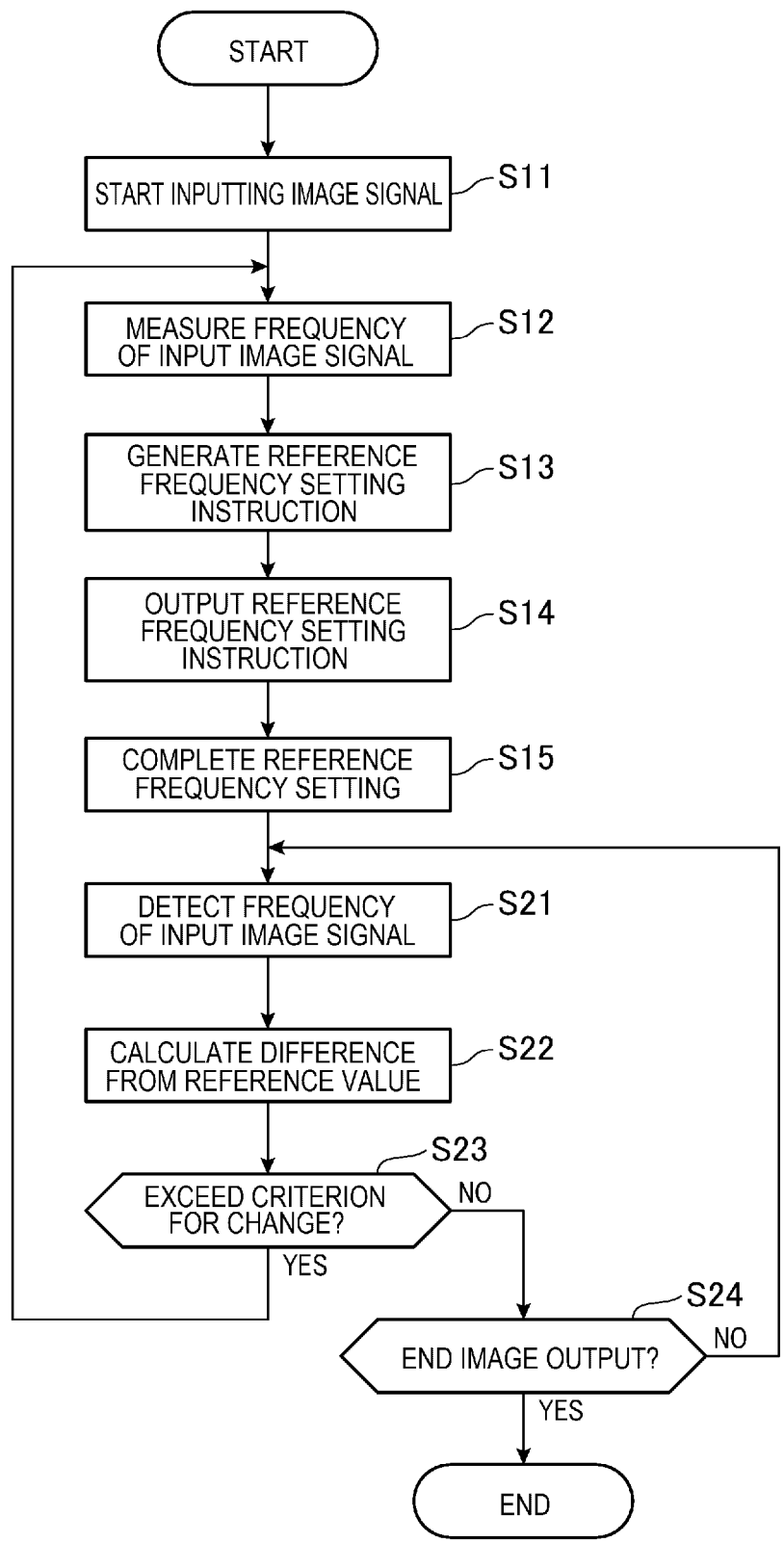
FIG. 5 is a flowchart showing operations of the projector.

FIGS. 4 and 5 are flowcharts showing operations of the projector 1 and particularly operations of the signal processing device 100. FIG. 4 shows an operation example in which the reference clock signal CLK1 is changed, based on the locked state of the PLL circuit 61. FIG. 5 shows an example in which the image processing control unit 32 monitors the frequency of the input image signal D1 and changes the reference clock signal CLK1 according to need.

In the description below, the operation in FIG. 4 is defined as a first operation example and the operation in FIG. 5 is defined as a second operation example. The projector 1 may selectively execute one of the first operation example and the second operation example or may execute these operation examples in parallel. The projector 1 may also be configured to be able to execute only one of the first operation example and the second operation example.

First Operation Example

In FIG. 4, the image processing control unit 32 detects that inputting of the input image signal D1 is started (step S11) and then measures the frequency of the input image signal D1 (step S12). The image processing control unit 32, for example, generates a pulse signal synchronized with the clock frequency of the input image signal D1, counts pulses, and thus measures the frequency.

The image processing control unit 32 generates the control data CD instructing the reference clock supply unit 26 to set the frequency of the reference clock signal CLK1, based on the result of measuring the frequency measured in step S12 (step S13).

The image processing control unit 32 outputs the control data CD to the reference clock supply unit 26 (step S14) and sets the frequency of the reference clock signal CLK1 to the reference clock supply unit 26 (step S15).

The image processing control unit 32 then monitors the locked state of the PLL circuit 61 (step S16). For example, if the first image processing IC 60 is configured to be able to output a lock detection signal that indicates the locked state of the PLL circuit 61, the image processing control unit 32 acquires the lock detection signal and thus determines the locked state. Meanwhile, for example, if the first image processing IC 60 is configured to be able to output the internal clock signal CLK11 generated by the PLL circuit 61 to outside, the image processing control unit 32 acquires the internal clock signal CLK11 and thus determines the locked state.

If the PLL circuit 61 is locked (YES in step S16), the image processing control unit 32 determines whether to stop outputting the output image signal D4 from the image processing unit 25 or not (step S17). For example, if an instruction to end projection is given by an operation detected by the input processing unit 53 or a control signal or the like inputted to the interface unit 24, the image processing control unit 32 determines that outputting of the output image signal D4 is to be stopped (YES in step S17) and ends this processing. Meanwhile, if the image processing control unit 32 determines that outputting of the output image signal D4 is not to be stopped (NO in step S17), the image processing control unit 32 returns to step S16.

If the image processing control unit 32 determines that the PLL circuit 61 is not locked (NO in step S16), the image processing control unit 32 blacks out the output image (step S18) and returns to step S12. The processing of blacking out the output image is, for example, to stop outputting the image signal D2 from the first image processing IC 60. Alternatively, the outputting of the output image signal D4 from the image processing unit 25 may be stopped. Also, the processing by the processing unit 62 may be stopped.

After blacking out the output image in step S18, the image processing control unit 32 returns to step S12 and execute the setting to the reference clock supply unit 26 again. Thus, even if the PLL circuit 61 is not locked due to a change in the frequency of the input image signal D1, the PLL circuit 61 can be made to operate according to the input image signal D1.

In the case of shifting from step S18 to step S12, the image processing control unit 32 cancels the blackout of the output image after the processing of outputting the control data CD to the reference clock supply unit 26 (step S14), and thus resumes outputting of the image.

Second Operation Example

In FIG. 5, the processing of steps S11 to S15 is the same as in the first operation example in FIG. 4.

After setting the frequency of the reference clock signal CLK1 to the reference clock supply unit 26 (step S15), the image processing control unit 32 detects the frequency of the input image signal D1 (step S21). In step S21, the frequency of the input image signal D1 may be detected in a simply or measurement similar to step S12 may be carried out.

The image processing control unit 32 calculates the difference between the frequency detected in step S21 and a reference value (step S22). The reference value is a reference value that is preset and included in the setting data 37, the internal clock signal CLK11 outputted from the PLL circuit 61 or a value found based on the reference clock signal CLK1 of the reference clock supply unit 26. Using the internal clock signal CLK11 as the reference value is effective because it makes it possible to cope with the operation state of the first image processing IC 60 more securely.

The image processing control unit 32 determines whether the difference calculated in step S22 exceeds a preset criterion for change or not (step S23). The criterion for change is a reference value to determine whether to change the frequency of the reference clock signal CLK1 or not. For example, the criterion for change is preset and included in the setting data 37. It is preferable that the criterion for change is set according to the breadth of the receivable range R2 and the breadth of the allowable range R1. It is also preferable that the criterion for change is a value by which it can be detected that the frequency of the input image signal D1 is included in the receivable range R2 and that the frequency of the input image signal D1 is different from the reference frequency of the PLL circuit 61. The criterion for change can be a narrower range than the receivable range R2. For example, in the case of FIGS. 3A and 3B, the criterion for change can be a range of ±500 ppm from the reference frequency.

If the difference calculated in step S22 exceeds the criterion for change (YES in step S23), the image processing control unit 32 returns to step S12. Meanwhile, if the difference calculated in step S22 does not exceed the criterion for change, the image processing control unit 32 determines whether to stop outputting the output image signal D4 from the image processing unit 25 or not (step S24). The determination in step S24 can be carried out similarly to step S17 (FIG. 4). If the image processing control unit 32 determines that outputting of the output image signal D4 is to be stopped (YES in step S24), the image processing control unit 32 ends this processing. Meanwhile, if the image processing control unit 32 determines that outputting of the output image signal D4 is not to be stopped (NO in step S24), the image processing control unit 32 returns to step S21.

The operations shown in FIGS. 4 and 5 can also be applied to the setting of the frequency of the reference clock signal CLK2 supplied from the reference clock supply unit 26 to the second image processing IC 70. That is, the image processing control unit 32 can set and change the frequency of the reference clock signal CLK2 supplied from the reference clock supply unit 26 for the operation of the second image processing IC 70. In this case, in steps S11 to S18 in FIG. 4, the image processing control unit 32 determines the locked state of the PLL circuit 71 and thus outputs the control data CD giving an instruction to set the frequency of the reference clock signal CLK2, to the reference clock supply unit 26. In this case, the operation to determine the locked state of the PLL circuit 71 is similar to the operation to determine the locked state of the PLL circuit 61. In steps S21 to S24 in FIG. 5, the image processing control unit 32 detects the frequency of the image signal D2 and thus outputs the control data CD giving an instruction to set the frequency of the reference clock signal CLK2, to the reference clock supply unit 26. In this case, the operation of the image processing control unit 32 detecting and determining the frequency of the image signal D2 is similar the operation of detecting and determining the frequency of the input image signal D1.

These configurations makes it possible to set the frequency of the reference clock signal CLK2 supplied from the reference clock supply unit 26, according to the change in the frequency of the image signal D2. Therefore, the frequency of the image signal D2 received by the processing unit 72 departs from the frequency range which the processing unit 72 can receive, setting the frequency of the reference clock signal CLK2 enables the processing unit 72 to receive and process the image signal D2.

As described above, the projector 1 according to the embodiment of the invention is a display device which displays an image based on the input image signal D1, and has the signal processing device 100. The signal processing device 100 has the first image processing IC 60, which performs the first processing on the input image signal D1, and the second image processing IC 70, which performs the second processing on the signal processed by the first image processing IC 60. The signal processing device 100 has the image processing control unit 32, which measures the frequency of the input image signal D1 and sets the reference frequency inputted to the first image processing IC 60, based on the measured frequency. The first image processing IC 60 is configured to be able to receive the input image signal D1 within a frequency range decided by the reference frequency. If the frequency of the input image signal D1 is out of a preset frequency range, the image processing control unit 32 sets the reference frequency in such a way as to include the frequency of the input image signal D1 into the frequency range which the first image processing IC 60 can receive.

With the display device according to the invention and the projector 1 to which the method for controlling the display device is applied, the first image processing IC 60 can process the input image signal D1 even if the frequency of the input image signal D1 is out of the frequency range which the first image processing IC 60 can receive.

In the operation example in FIG. 5, if the accuracy of the frequency of the input image signal D1 includes a change over a broader range than the frequency range which the first image processing IC 60 can receive, the image processing control unit 32 measures the frequency of the input image signal D1. Thus, it is possible to measure and cope with the frequency of the input image signal D1 when the first image processing IC 60 may not be able to receive the input image signal D1.

The image processing control unit 32 also measures the frequency of the input image signal D1 when inputting of the input image signal D1 is started. Thus, the frequency of measuring the frequency of the input image signal D1 can be restrained and the processing load can be reduced.

The first image processing IC 60 outputs a signal with a higher transmission speed than the input image signal D1, to the second image processing IC 70. Thus, even if the first image processing IC 60 capable of coping with an output of a high-speed signal has specifications that can tolerate a narrow frequency range for the input image signal D1, the first image processing IC 60 can receive and process the input image signal D1 over a broad frequency range.

The first image processing IC 60 has the PLL circuit 61, which is locked to the frequency of the input image signal D1, based on the reference frequency. The image processing control unit 32 sets the reference frequency in such a way as to include the frequency of the input image signal D1 into the frequency range to which the PLL circuit 61 is locked. That is, setting the reference frequency of the PLL circuit 61 according to the input image signal D1 makes it possible to set the frequency range to which the PLL circuit 61 can be locked, according to the input image signal D1. Thus, the first image processing IC 60 can securely process the input image signal D1.

The first image processing IC 60 performs at least one of resolution conversion processing, color correction processing, and image blending processing on the input image signal D1. Thus, the IC performing resolution conversion processing, color correction processing, image blending processing or the like on the input image signal D1 can receive and process the input image signal D1 over a broad frequency range.

Each configuration in the foregoing embodiment is simply an example of its specific form and therefore should not limit the invention. The invention can also be applied in different forms.

For example, while the input image signal D1 inputted from the image supply device 2 to the interface unit 24 is inputted to the image processing unit 25 in the description of the embodiment, the configuration to input the input image signal D1 to the image processing unit 25 is not particularly limited. For example, a signal outputted from a built-in circuit in the projector 1 may be inputted as the input image signal D1 to the image processing unit 25. Also, a signal inputted to the interface unit 24 may be processed by another circuit and the processed signal may be inputted as the input image signal D1 to the image processing unit 25.

The invention has the foregoing effects, provided that the image signal D2 outputted from the first image processing IC 60 via the bus 102 is transmitted by a data transmission method with a higher speed than the input image signal D1 inputted to the first image processing IC 60. It can also be said that the invention is effective when applied to the case where the clock frequency of the image signal D2 transmitted via the bus 102 is higher than the clock frequency of the input image signal D1. Therefore, the input image signal D1 is not limited to the HDMI signal, and the bus 102 is not limited to transmitting the image signal D2 by 12G-SDI.

The display device according to the invention is not limited to the projector 1 projecting an image on the screen SC. For example, the display device may be a liquid crystal display having a liquid crystal display panel. The display device may also be, for example, a display having a PDP (plasma display panel) or organic EL display panel. The invention can also be applied to various other display devices.

At least a part of the functional blocks shown in the block diagrams in the embodiment may be implemented by hardware or by a collaboration of hardware and software. Therefore, these functional blocks are not limited to the configurations in which independent hardware resources are arranged as illustrated in the block diagrams. The program executed by the control unit may be stored in the storage unit or another storage device (not illustrated). Alternatively, the control unit may acquire and execute the program stored in an external device. Also, specific details of the configuration of each of the other parts of the devices forming the display system 200 can be changed arbitrarily without departing from the spirit of the invention.

What is claimed is:

1. A display device which displays an image based on an input image signal, the display device comprising:
   a first IC which performs first processing on the input image signal;
   a second IC which performs second processing on the signal processed by the first IC; and
   a setting unit which measures a frequency of the input image signal and sets a reference frequency inputted to the first IC, based on the measured frequency,
   wherein the first IC is configured to be able to receive the input image signal within a frequency range decided by the reference frequency,
   the setting unit sets the reference frequency such that the frequency range decided by the reference frequency includes the frequency of the input image signal, if the frequency of the input image signal is out of the frequency range decided by the reference frequency, and
   the display device displays the image based on the input image signal.

2. The display device according to claim 1, wherein the setting unit measures the frequency of the input image signal if an accuracy of the frequency of the input image signal includes a change over a broader range than the frequency range that the first IC can receive.

3. The display device according to claim 1, wherein the setting unit measures the frequency of the input image signal when inputting of the input image signal is started.

4. The display device according to claim 1, wherein the first IC outputs a signal having a higher transmission speed than the input image signal, to the second IC.

5. The display device according to claim 1, wherein the first IC has a PLL circuit which is locked to the frequency of the input image signal, based on the reference frequency, and
the setting unit sets the reference frequency in such a way as to include the frequency of the input image signal into a frequency range to which the PLL circuit is locked.

6. The display device according to claim 1, wherein the first IC performs at least one of resolution conversion processing, color correction processing, and image blending processing, as the first processing.

7. A signal processing device comprising:
a first IC which performs first processing on an input signal;
a second IC which performs second processing on the signal processed by the first IC; and
a setting unit which measures a frequency of the input signal and sets a reference frequency inputted to the first IC, based on the measured frequency,
wherein the first IC is configured to be able to receive the input signal within a frequency range decided by the reference frequency, and
the setting unit sets the reference frequency such that the frequency range decided by the reference frequency includes the frequency of the input signal, if the frequency of the input signal is out of the frequency range decided by the reference frequency.

8. The signal processing device according to claim 7, wherein the setting unit measures the frequency of the input signal if an accuracy of the frequency of the input signal includes a change over a broader range than the frequency range that the first IC can receive.

9. The signal processing device according to claim 7, wherein the setting unit measures the frequency of the input signal when inputting of the input signal is started.

10. The signal processing device according to claim 7, wherein the first IC outputs a signal having a higher transmission speed than the input signal, to the second IC.

11. The signal processing device according to claim 7, wherein the first IC has a PLL circuit which is locked to the frequency of the input signal, based on the reference frequency, and
the setting unit sets the reference frequency in such a way as to include the frequency of the input signal into a frequency range to which the PLL circuit is locked.

12. The signal processing device according to claim 7, wherein the first IC performs at least one of resolution conversion processing, color correction processing, and image blending processing, as the first processing.

13. A method for controlling a display device, the display device having a first IC which performs first processing on an input image signal and a second IC which performs second processing on the signal processed by the first IC and displaying an image based on the input image signal, the method comprising:
configuring the first IC to receive the input image signal within a frequency range decided by a reference frequency and perform the first processing;
measuring a frequency of the input image signal;
setting the reference frequency inputted to the first IC such that the frequency range decided by the reference frequency includes the frequency of the input image signal, if the frequency of the input image signal is out of the frequency range decided by the reference frequency; and
displaying the image based on the input image signal.

14. The method for controlling the display device according to claim 13, wherein the measuring the frequency of the input image signal includes
measuring the frequency of the input image signal if an accuracy of the frequency of the input image signal includes a change over a broader range than the frequency range that the first IC can receive.

15. The method for controlling the display device according to claim 13, wherein the measuring the frequency of the input image signal includes
measuring the frequency of the input image signal when inputting of the input image signal is started.

16. The method for controlling the display device according to claim 13, wherein a signal having a higher transmission speed than the input image signal is transmitted from the first IC to the second IC.

17. The method for controlling the display device according to claim 13, wherein the first IC has a PLL circuit which is locked to the frequency of the input image signal, based on the reference frequency, and
the setting the reference frequency includes
setting the reference frequency in such a way as to include the frequency of the input image signal into a frequency range to which the PLL circuit is locked.

18. The method for controlling the display device according to claim 13, wherein at least one of resolution conversion processing, color correction processing, and image blending processing is performed as the first processing by the first IC.

* * * * *